United States Patent
Nakamura

(10) Patent No.: US 10,800,142 B2
(45) Date of Patent: Oct. 13, 2020

(54) LAMINATED GLASS

(71) Applicant: AGC Inc., Chiyoda-ku (JP)

(72) Inventor: Atsushi Nakamura, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 67 days.

(21) Appl. No.: 16/210,292

(22) Filed: Dec. 5, 2018

(65) Prior Publication Data

US 2019/0105878 A1    Apr. 11, 2019

Related U.S. Application Data

(63) Continuation of application No. PCT/JP2017/022693, filed on Jun. 20, 2017.

(30) Foreign Application Priority Data

Jun. 24, 2016  (JP) .................... 2016-125385

(51) Int. Cl.
  *B32B 17/10*  (2006.01)
  *B60J 1/00*  (2006.01)

(52) U.S. Cl.
  CPC ........ *B32B 17/10036* (2013.01); *B32B 17/10* (2013.01); *B32B 17/10568* (2013.01); *B32B 17/10761* (2013.01); *B32B 17/10816* (2013.01); *B60J 1/00* (2013.01); *B32B 2250/05* (2013.01); *B32B 2307/102* (2013.01);
  (Continued)

(58) Field of Classification Search
  CPC .............. B32B 17/10036; B32B 17/10; B32B 17/10568; B32B 17/10761; B32B 17/10816; B32B 2250/05; B32B 2307/102; B32B 2307/72; B32B 2329/06; B32B 2605/006; B60J 1/00
  See application file for complete search history.

(56) References Cited

U.S. PATENT DOCUMENTS 3,751,238 A * 8/1973 Grego ................ C03C 21/002
                                                      65/30.14
4,193,474 A * 3/1980 Okubo ................ C04B 14/30
                                                      181/287
(Continued)

FOREIGN PATENT DOCUMENTS

CA    2162243 A    5/1996
CN    103781741 A    5/2014
(Continued)

OTHER PUBLICATIONS

JP-05330864-A Machine Translation (Year: 1993).*
(Continued)

*Primary Examiner* — Travis M Figg
(74) *Attorney, Agent, or Firm* — Oblon, McClelland, Maier & Neustadt, L.L.P.

(57) ABSTRACT

Laminated glass for automobile windshield includes: a first and a second glass plate facing each other, and an intermediate film disposed between the glass plates and including a plurality of core layers and a plurality of skin layers alternately laminated. The plurality of core layers have a glass transition point of lower than 15° C. The plurality of skin layers have a glass transition point of 15° C. or higher. The plurality of core layers include two or more core layers. The laminated glass has a maximum degree of unevenness of 3 μm or less in a test area A.

10 Claims, 4 Drawing Sheets

(52) U.S. Cl.
CPC ....... *B32B 2307/72* (2013.01); *B32B 2329/06* (2013.01); *B32B 2605/006* (2013.01)

(56) References Cited

U.S. PATENT DOCUMENTS

| | | | |
|---|---|---|---|
| 2002/0150744 A1* | 10/2002 | Nagai | B32B 27/40 428/215 |
| 2006/0201202 A1* | 9/2006 | Nakajima | C03C 17/2456 65/60.5 |
| 2012/0021231 A1 | 1/2012 | Hirota et al. | |
| 2012/0025559 A1* | 2/2012 | Offermann | B32B 17/10761 296/84.1 |
| 2013/0074931 A1* | 3/2013 | Chen | C08K 5/103 136/259 |
| 2014/0227489 A1* | 8/2014 | Inui | B32B 17/10036 428/172 |
| 2016/0159282 A1* | 6/2016 | Kurihara | B32B 17/10541 348/148 |
| 2017/0050415 A1* | 2/2017 | Kanki | B32B 17/10036 |
| 2017/0225435 A1* | 8/2017 | Hirano | B32B 17/10688 |
| 2018/0281351 A1 | 10/2018 | Nakamura et al. | |

FOREIGN PATENT DOCUMENTS

| | | | |
|---|---|---|---|
| CN | 105980325 A | 9/2016 | |
| EP | 0 710 545 A1 | 5/1996 | |
| EP | 2 752 396 A1 | 7/2014 | |
| EP | 3 106 443 A1 | 12/2016 | |
| EP | 3 202 740 A1 | 8/2017 | |
| JP | 5-330864 | 12/1993 | |
| JP | 05330864 A | * 12/1993 | ....... B32B 17/10761 |
| JP | 9-40444 | 2/1997 | |
| JP | 10-338556 | 12/1998 | |
| JP | 2015-151308 | 8/2015 | |
| KR | 10-2017-0063432 A | 6/2017 | |
| WO | WO 2010/095749 A1 | 8/2010 | |
| WO | WO 2013/031884 A1 | 3/2013 | |
| WO | WO 2015/122507 A1 | 8/2015 | |
| WO | WO 2016/052672 A1 | 4/2016 | |
| WO | WO 2017/099166 A1 | 6/2017 | |

OTHER PUBLICATIONS

International Search Report dated Sep. 26, 2017 in PCT/JP2017/022693, filed on Jun. 20, 2017 (with English Translation).
Written Opinion dated Sep. 26, 2017 in PCT/JP2017/022693, filed on Jun. 20, 2017.

* cited by examiner

LAMINATED GLASS

CROSS-REFERENCE TO RELATED APPLICATIONS

This application is a continuation of prior International Application No. PCT/JP2017/022693, filed on Jun. 20, 2017 which is based upon and claims the benefit of priority from Japanese Patent Application No. 2016-125385 filed on Jun. 24, 2016; the entire contents of all of which are incorporated herein by reference.

FIELD

The present invention relates to laminated glass, and particularly to laminated glass for automobile windshield provided with a high sound insulating property and hardly having such perspective distortion as inhibits driver's visibility.

BACKGROUND

A laminated glass is made by sandwiching an intermediate film made of resin or the like between a pair of glass plates and compressing them under heating. Since the laminated glass has safety without scattering of fragments when broken, it is widely used for window glass of a vehicle such as an automobile. In addition to the safety such as scattering prevention, recent laminated glasses for automobile have various functions imparted by appropriately selecting the intermediate film. Among the functions, a sound insulating property is highly desired. So, an increase of sound insulating performance is attempted using an intermediate film for automobile including laminating resin films of different properties.

For example, Patent Reference 1 (WO 2010/095749 A1) describes laminated glass using a first intermediate film including two kinds of sound insulating layers and an intermediate layer sandwiched between the sound insulating layers. The sound insulating layers contain a polyvinyl acetal resin and a plasticizer at different ratios. The intermediate layer contains the polyvinyl acetal resin and the plasticizer and having a different acetyl group amount from the sound insulating layers. Patent Reference 1 describes another laminated glass using a second intermediate film including the first intermediate film sandwiched with surface protection layers similar to the intermediate layer. The laminated glass described in Patent Document 1 exerts a sound insulating property at a certain level or more at a temperature range of 10 to 60° C., but does not have a particularly excellent sound insulating property.

Further, in the laminated glass for automobile, perspective distortion has sometimes deteriorated by making improvements to the intermediate for the purpose of enhancing the sound insulating property. The deterioration in perspective distortion in the laminated glass for automobile has been a problem particularly from the viewpoint of inhibiting driver's visibility in a windshield.

SUMMARY

The present invention has been made from the above-described viewpoint, and is an object to provide laminated glass for automobile windshield provided with a high sound insulating property and hardly having such perspective distortion as inhibits driver's visibility.

Laminated glass for automobile windshield includes: a first and a second glass plate facing each other, and an intermediate film disposed between the glass plates and including a plurality of core layers and a plurality of skin layers alternately laminated. The plurality of core layers have a glass transition point of lower than 15° C. The plurality of skin layers have a glass transition point of 15° C. or higher. The plurality of core layers include two or more core layers. The laminated glass has a maximum degree of unevenness of 3 µm or less in a test area A.

(Measuring Method of Degree of Unevenness)

The test area A is defined by JIS R3212 (1998).

Degree of unevenness are measured as follows:

drawing first straight lines and second straight lines in the test area A to define a plurality of intersection points of the first and second straight lines, the first straight lines being along a vertical direction of the laminated glass and having 15 mm intervals, the second straight lines being along a horizontal direction orthogonal to the vertical direction and having 15 mm intervals, the plurality of intersection points excluding intersection points which distances from an upper end or a lower end of the test area A are shorter than 15 mm, and deciding degrees of unevenness at the plurality of intersection points by a following formula (1).

$$\text{Degree of unevenness} = |T - (T_{up} + T_{down})/2| \qquad (1)$$

T: a thickness of laminated glass at a first point included in the plurality of intersection points, $T_{up}$: a thickness of laminated glass at a second point included in the plurality of intersection points and closest to the first point in an upper direction of the first point, the second point being at an upper end of the first straight lines on the first point when no intersection point exists in the upper direction of the first point, and $T_{down}$: a thickness of laminated glass at a third point included in the plurality of intersection points and closest to the first point in a lower direction of the first point, the third point being at a lower end of the first straight lines on the first point when no intersection point exists in the lower direction of the first point.

According to the present invention, it is possible to provide laminated glass for automobile windshield provided with a high sound insulating property and hardly having such perspective distortion as inhibits driver's visibility.

DETAILED DESCRIPTION

Figure 1:
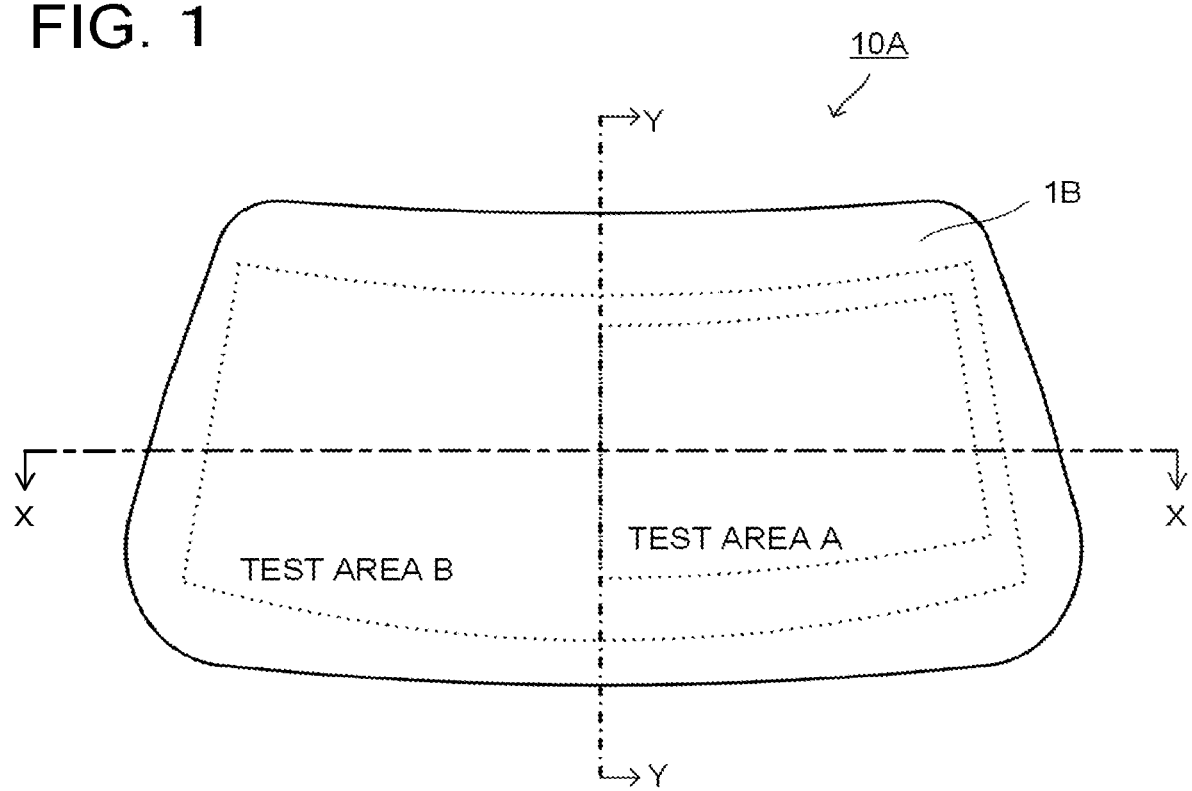
FIG. 1 is a front view of an example of an embodiment of laminated glass of the present invention.

Hereinafter, embodiments of the present invention will be described. It should be noted that the present invention is not limited to these embodiments, and these embodiments may be changed or modified without departing from the spirit and scope of the present invention.

Laminated glass of the present invention is laminated glass for automobile windshield and includes: a pair of glass plates facing each other; and an intermediate film sandwiched between the pair of glass plates.

The above-described intermediate film is constituted by alternately laminating skin layers each having a glass transition point of 15° C. or higher and core layers each having a glass transition point of lower than 15° C., and has two or more core layers.

In the laminated glass of the present invention, in a test area A defined by JIS R3212 (1998) (hereinafter, also simply referred to as "test area A"), according to the above-described "measuring method of degree of unevenness", a maximum value of degrees of unevenness measured at a plurality of predetermined points is 3 μm or less.

The glass transition point in this embodiment means a peak temperature of tan δ when measuring the temperature dependency of tan δ (loss modulus/storage modulus) of a sample by a dynamic viscoelasticity test under conditions of a frequency: 1 Hz, a dynamic shear strain: 0.015%, a temperature increasing rate: 3° C./min, and a measured temperature range: −40° C. to 80° C.

tan δ can be measured by preparing a sample formed into, for example, a disk shape having a thickness d=0.6 mm and a diameter of 12 mm, and measuring the sample by a dynamic viscoelasticity measurement apparatus using a measuring jig: parallel plate (diameter of 12 mm) under the above-described conditions. The dynamic viscoelasticity measurement apparatus is, for example, Rotational Rheometer MCR301 manufactured by Anton Paar GmbH.

In this embodiment, a case of being simply referred to as "laminated glass" means laminated glass for automobile windshield. Notations of "up" and "down" used for the following explanation indicate the upside and the downside respectively when the laminated glass is mounted on an automobile. In this embodiment, "vertical direction of laminated glass" (including a case of being simply referred to as "vertical direction".) is a direction orthogonal to a horizontal line, and a direction orthogonal to the vertical direction is "horizontal direction of laminated glass" (including a case of being simply referred to as "horizontal direction".).

The laminated glass of the present invention has the constitution in which the intermediate film sandwiched between the pair of glass plates includes a skin layer with the glass transition point of 15° C. or higher between at least two core layers (the glass transition point of lower than 15° C.), thereby having an unprecedented high sound insulating property.

In the laminated glass of the present invention, according to the above-described "measuring method of degree of unevenness" in the test area A, the maximum value of degrees of unevenness (hereinafter, also referred to as "maximum degree of unevenness".) measured at a plurality of predetermined points is 3 μm or less. The test area A is a test area defined as "a test area of a safety glass used for a front surface" defined by JIS R3212 (1998, "a test method of safety glass for automobile"), and a test area corresponding to a front surface of a driver seat. Note that the test area A can be said to be a preferable area where driver's field of view is secured at the minimum in order to secure driver's safety. In the test area A, as long as the maximum degree of unevenness is 3 μm or less, the laminated glass is the one in which such perspective distortion as inhibits driver's visibility is hardly recognized.

Specifically, as long as the maximum degree of unevenness is 3 μm or less in the test area A of the laminated glass, the laminated glass is installed such that the angle which a horizontal plane forms with a principal surface thereof becomes 25 degrees, and a maximum value of perspective distortion (hereinafter, referred to as "perspective distortion$_{Max}$") in the test area A, which is measured by a distortion tester SCREENSCAN (product name) manufactured by ISRA VISION AG, can be set to 220 [mdpt] or less in which the perspective distortion can hardly visually confirmed. That is, as described above, in the laminated glass having the intermediate film made by laminating the at least two core layers and the skin layer and having the high sound insulating property, as long as the maximum degree of unevenness is 3 μm or less in the test area A of the laminated glass, it is possible to form the laminated glass hardly having such perspective distortion as inhibits the driver's visibility.

In the laminated glass of the present invention, a ratio of the mass of the intermediate film to the total mass of the intermediate film and the pair of glass plates is preferably 14 mass % or more. The intermediate film includes the skin layer whose glass transition point is 15° C. or higher between the at least two core layers (a glass transition point is lower than 15° C.) and the ratio of the mass of the intermediate film to the total mass of the intermediate film and the pair of glass plates falls within the above-described range. Thus, vibrational energy of sound in the laminated glass causes generation of large shear deformation energy at a plurality of points in the intermediate film between the pair of glass plates, and the shear deformation energy is released as heat energy, thereby allowing sound insulating performance to be exhibited.

In the laminated glass of the present invention, the ratio of the mass of the intermediate film to the total mass of the intermediate film and the pair of glass plates (hereinafter, simply also referred to as "intermediate film mass %".) is further preferably 15 mass % or more, and further preferably 17 mass % or more from the viewpoints of a sound insulating property and reduction in weight. Further, it is preferably 50 mass % or less, and more preferably 40 mass % or less from the viewpoint of maintaining desired strength.

In the laminated glass of the present invention, a surface density is preferably 13.5 kg/m$^2$ or less, more preferably 12 kg/m$^2$ or less, and further preferably 11 kg/m$^2$ or less. As long as the surface density of the laminated glass falls within the above-described range, the reduction in weight of the laminated glass can be achieved. The surface density of the laminated glass of the present invention is preferably 8 kg/m$^2$ or more, and more preferably 9 kg/m$^2$ or more from the viewpoint of maintaining the desired strength.

Note that the intermediate film mass % and the surface density of the laminated glass are values to be measured as the entire sheet of laminated glass.

Figure 2:
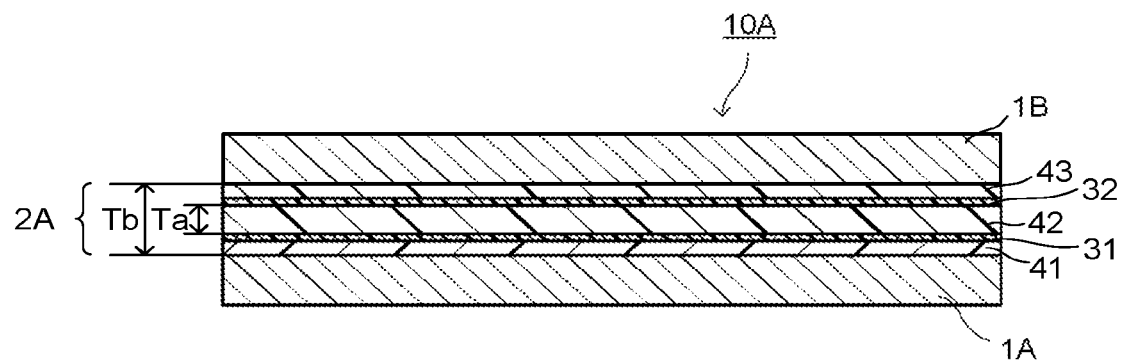
FIG. 2 is a cross-sectional view along a horizontal direction, taken along a line X-X of the laminated glass illustrated in FIG. 1.
Figure 3:
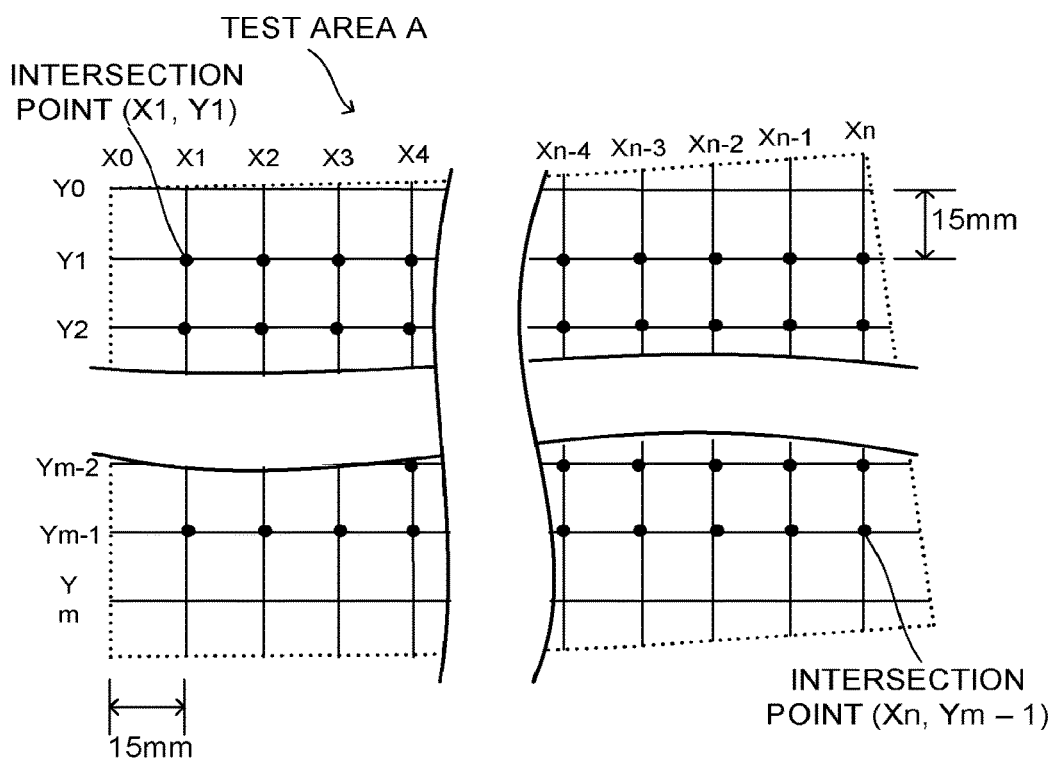
FIG. 3 is a view illustrating measurement points of degrees of unevenness in a test area A of the laminated glass illustrated in FIG. 1.

Hereinafter, an embodiment of the laminated glass of the present invention will be explained with reference to the drawings while exemplifying a case of using a five-layer laminated film as an intermediate film. FIG. 1 is a front view in an example of the embodiment of the laminated glass of the present invention using the five-layer laminated film as the intermediate film, and FIG. 2 is a cross-sectional view along a horizontal direction, taken along a line X-X of the laminated glass illustrated in FIG. 1. FIG. 3 is a view illustrating measurement points of degrees of unevenness in a test area A of the laminated glass illustrated in FIG. 1.

Laminated glass 10A illustrated in FIG. 1 and FIG. 2 has a pair of glass plates 1A, 1B facing each other and an intermediate film 2A disposed so as to be sandwiched by the pair of glass plates 1A, 1B. The intermediate film 2A is constituted by laminating five layers in the order of a skin layer 41, a core layer 31, a skin layer 42, a core layer 32, and a skin layer 43 from the glass plate 1A side toward the glass plate 1B side. A principal surface of the laminated glass 10A has a typical principal surface shape of an automobile windshield, namely, a substantially trapezoidal shape having a lower edge longer than an upper edge. The laminated glass 10A is fixed to an automobile such that an upper side thereof corresponds to an upper side of the automobile windshield. In the laminated glass 10A, the pair of glass plates 1A, 1B, and the two core layers 31, 32, and the three skin layers 41, 42, 43 constituting the intermediate film each have a principal surface with substantially the same shape and dimensions.

Here, in this embodiment, "substantially the same shape and dimensions" means to have the same shape and the same dimensions as viewed by people. In other cases, "substantially" also indicates the same meaning as above.

FIG. 1 schematically illustrates a test area A in the laminated glass 10A and a test area B occupied by a larger area than the test area A and defined by JIS R3212 (1998) as areas each surrounded by a dotted line. Note that the test area A illustrated in FIG. 1 is a test area A in a case of a right handle, and a center line in a vertical direction (line Y-Y) of the laminated glass 10A and a left edge thereof are illustrated to overlap each other. Further, in a case of a left handle, a symmetrical position from the center line in the vertical direction (line Y-Y) of the test area A illustrated in FIG. 1 is a test area A.

In the laminated glass of the present invention, "measuring method of degree of unevenness" to be used as an evaluation method of the perspective distortion will be explained below by exemplifying FIG. 3 and FIG. 4.

FIG. 3 is a plan view enlarging and illustrating the test area A of the laminated glass 10A illustrated in FIG. 1. In the laminated glass of the present invention, the test area A is an area which becomes a measurement object of degrees of unevenness, and the degrees of unevenness are calculated by a formula (1) at a plurality of predetermined points in the area. Then, a maximum value among the obtained plurality of degrees of unevenness, namely a maximum degree of unevenness is 3 μm or less.

The predetermined points where the degrees of unevenness in the test area A are found, namely measurement points of the degrees of unevenness are set to be all intersection points in which when straight lines are drawn at 15 mm intervals in the vertical direction and the horizontal direction on the test area A, the following non-objective intersection points are excluded from all intersection points between the straight lines. When the laminated glass 10A has a curvature, straight lines are drawn at 15 mm intervals along over its curved surface. However, intersection points in each of which a distance between an upper end of the test area A and the straight line or a distance between a lower end thereof and the straight line is shorter than 15 mm are excluded from calculation of degrees of unevenness. Further, a straight line overlapping with an outer periphery of the test area A is not included in the straight lines drawn at 15 mm intervals in the vertical direction and the horizontal direction on the test area A. Thereby, intersection points on the straight line overlapping with an outer periphery of the test area A are not the above-described intersection points between the straight lines, and are excluded from the calculation of the degree of unevenness.

In FIG. 3, the test area A is an area surrounded by the dotted line, an upper-left vertex thereof is set as a starting point, straight lines (indicated by solid lines) in the vertical direction X1, X2, X3, X4, . . . , Xn−4, Xn−3, Xn−2, Xn−1, Xn (n is an integer obtained by dividing a length (mm) in the horizontal direction of the test area A by 15 mm.) are spaced every 15 mm rightward. Further, the upper-left vertex of the test area A is set as the starting point, straight lines (indicated by solid lines) in the horizontal direction Y1, Y2, . . . , Ym−2, Ym−1, Ym (m is an integer obtained by dividing a length (mm) in the vertical direction of the test area A by 15 mm.) are spaced every 15 mm downward. Note that a straight line X0 is a straight line (dotted line) in the vertical direction which corresponds with the left edge of the test area A. Furthermore, a straight line Y0 is a straight line (solid line) drawn in the horizontal direction from the upper-left vertex of the test area A.

In the test area A illustrated in FIG. 3, the measurement points of the degrees of unevenness are all intersection points excluding intersection points on the straight line X0, intersection points on the straight line Y0, and intersection points on a straight line Ym. The intersection points being the measurement points of the degrees of unevenness are indicated by black points in FIG. 3. Hereinafter, as necessary, the intersection points of the straight lines in the test area A are represented in combination of straight line symbols. For example, the upper-left vertex of the test area A is represented as an intersection point of the straight line X0 and the straight line Y0 by the intersection point (X0, Y0), and an intersection point of the straight line X1 and the straight line Y1 is represented by the intersection point (X1, Y1).

For example, the intersection point (X1, Y1) is the measurement point of the degree of unevenness, and when the degree of unevenness of the intersection point (X1, Y1) is set to a degree of unevenness$_{(X1,\ Y1)}$, a numeric value of the degree of unevenness$_{(X1,\ Y1)}$ is found by the formula (1).

$$\text{Degree of unevenness}_{(X1,Y1)} = |T - (T_{up} + T_{down})/2| \tag{1}$$

In this case, T is a thickness of the laminated glass at the intersection point (X1, Y1) in the formula (1). $T_{up}$ is a thickness of the laminated glass at the intersection point immediately close to an upper direction of the intersection point (intersection point (X1, Y1)) where the degree of unevenness is found, namely at the intersection point (X1, Y0), and $T_{down}$ is a thickness of the laminated glass at the intersection point immediately close to a lower direction of the intersection point (intersection point (X1, Y1)) where the degree of unevenness is found, namely at the intersection point (X1, Y2).

In other words, the degree of unevenness$_{(X1,\ Y1)}$ is an absolute value of a value obtained by subtracting an average value of the thicknesses of the laminated glass at the intersection point (X1, Y0) and at the intersection point (X1, Y2) being intersection points above and below the intersection point (X1, Y1) from the thickness of the laminated glass at the intersection point (X1, Y1). The degrees of unevenness in the test area A illustrated in FIG. 3 are calculated in a range of the intersection point (X1, Y1) to the intersection point (Xn, Ym−1) as the degree of unevenness$_{(X1,\ Y1)}$ to the degree of unevenness$_{(Xn,\ Ym-1)}$, and the total number of measurements is n×(m−1) pieces. Note that the thickness of the laminated glass can be measured by a plate thickness measuring device, for example, Optigauge (manufactured by Lumetrics Inc.) or the like.

A maximum value of n×(m−1)-piece degrees of unevenness (maximum degree of unevenness) calculated as described above is used for evaluation. In the laminated glass of the present invention, the maximum degree of unevenness is 3 µm or less in the test area A. The maximum degree of unevenness is preferably 2.7 µm or less, and more preferably 2.5 µm or less.

Figure 4:
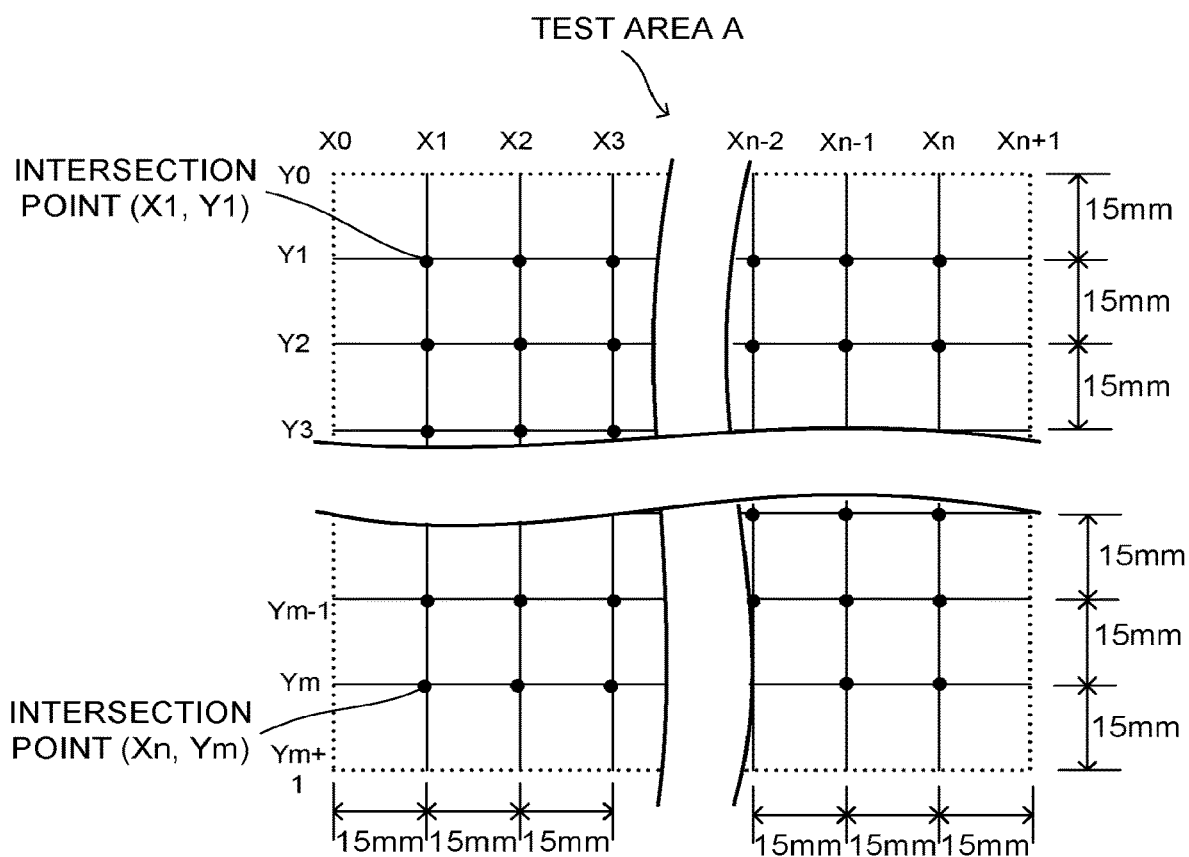
FIG. 4 is a view illustrating measurement points of degrees of unevenness in an example of the laminated glass having a rectangular test area A.

FIG. 4 is a view illustrating measurement points (indicated by black points) of degrees of unevenness when a test area A is rectangular and upper and lower edges and left and right edges each have a length of multiples of 15 mm. In FIG. 4, the test area A is an area surrounded by the dotted line. Similarly to the one illustrated in FIG. 3, straight lines (indicated by solid lines) in the vertical direction X1 . . . Xn (n is a value obtained by subtracting 1 from an integer obtained by dividing a length (mm) in the horizontal direction of the test area A by 15 mm.) and straight lines (indicated by solid lines) in the horizontal direction Y1, . . . , Xm (m is a value obtained by subtracting 1 from an integer obtained by dividing a length (mm) in the vertical direction of the test area A by 15 mm.) are spaced every 15 mm.

Note that the straight lines X0, Y0, Xn+1, Ym+1 are straight lines (dotted lines) corresponding with a left edge, an upper edge, a right edge, a lower edge of the test area A respectively. Accordingly, these straight lines are not included in the straight lines drawn at 15 mm intervals in the vertical direction and the horizontal direction on the test area A. Intersection points on the straight line Y1 in the test area A, illustrated in FIG. 4, correspond to a case where no intersection point exists in the upper direction at the occasion of the calculation of the degrees of unevenness. Accordingly, a thickness of the laminated glass in a position of an upper end of the straight line in the vertical direction on which intersection points where the degrees of unevenness are found exist is used as $T_{up}$ in the formula (1). For example, $T_{up}$ when a degree of unevenness of an intersection point (X1, Y1) is found is a thickness of the laminated glass at an upper end of the straight line X1, namely at an intersection point (X1, Y0) of the straight line X1 and the upper edge of the test area A.

Similarly, intersection points on the straight line Ym in the test area A correspond to a case where no intersection point exists in the lower direction at the occasion of the calculation of the degrees of unevenness. Accordingly, a thickness of the laminated glass in a position of a lower end of the straight line in the vertical direction on which intersection points where the degrees of unevenness are found exist is used as $T_{down}$ in the formula (1). For example, $T_{down}$ when a degree of unevenness of an intersection point (X1, Ym) is found is a thickness of the laminated glass at a lower end of the straight line X1, namely at an intersection point (X1, Ym+1) of the straight line X1 and the lower edge of the test area A. Note that in a case where a length from the intersection point (X1, Ym) to the lower end of the straight line X1, namely a distance from the intersection point (X1, Ym) to the lower edge of the test area A is shorter than 15 mm, since a value of $T_{down}$ in the formula (1) cannot be taken, the intersection point (X1, Ym) is excluded from measurement of the degree of unevenness.

Further, in the laminated glass of the present invention, in the test area B having a larger area than the test area A, a maximum degree of unevenness measured in a manner similar to that of the test area A is preferably 4 µm or less, and the maximum degree of unevenness in the test area B is further preferably 3.5 µm or less. As long as the maximum degree of unevenness is 3 µm or less in the test area B, a state where there is little perspective distortion in a wider range is caused, which is more preferable from the viewpoint of safety. Note that a measuring method of the maximum degree of unevenness in the test area B is similar to the above-described one in the test area A. Hereinafter, each of the elements constituting the laminated glass 10A will be explained.

[Glass Plate]

Plate thicknesses of the pair of glass plates 1A, 1B in the laminated glass 10A can each be appropriately adjusted in a range of functioning for an automobile windshield by materials of a glass plate to be used and an intermediate film to be combined therewith. Further, the plate thicknesses of the glass plates 1A, 1B are each preferably set to a thickness in which intermediate film mass % in forming the laminated glass 10A falls within a predetermined range. Though the thicknesses of the glass plates 1A, 1B can be appropriately selected according to the kind of automobile using the laminated glass 10A or the like, they can each be set to 0.1 to 10 mm in general. Note that in order to make the surface density of the laminated glass 10A fall within the above-described preferable range, the plate thicknesses of the glass plates 1A, 1B are each preferably 0.3 to 2.5 mm.

The plate thicknesses of the pair of glass plates 1A, 1B may be the same as or different from each other. When the plate thicknesses are different in the glass plates 1A, 1B, the plate thickness of the glass plate located on a vehicle-interior side is preferably smaller than the plate thickness of the glass plate located on a vehicle-exterior side.

For example, in the laminated glass 10A, when the glass plate located on the vehicle-interior side in use is the glass plate 1A, the plate thickness of the glass plate 1A is preferably 0.5 mm to 1.6 mm, and more preferably 0.7 mm to 1.5 mm. Further, the plate thickness of the glass plate 1A is preferably smaller than the plate thickness of the glass plate 1B. A difference between the plate thickness of the glass plate 1A and the plate thickness of the glass plate 1B is preferably 0.3 to 1.5 mm, and more preferably 0.5 to 1.3 mm. Further, in this case, the glass plate 1B is the glass plate located on the vehicle-exterior side, and the plate thickness thereof is preferably 1.6 mm to 2.5 mm, and more preferably 1.7 mm to 2.1 mm.

In use of the laminated glass, the glass plate located on the vehicle-exterior side having a plate thickness larger than that of the glass plate located on the vehicle-interior side is preferable in terms of flying stone impact resistance. In terms of flying stone impact resistance, the plate thickness on the vehicle-exterior side is preferably 1.3 mm or more.

Examples of materials of the glass plates 1A, 1B used for the laminated glass 10A include transparent inorganic glass and organic glass (resin). As the inorganic glass, ordinary soda lime glass (also referred to as soda lime silicate glass), aluminosilicate glass, borosilicate glass, non-alkali glass, quartz glass and the like are used without any particular limitation. Among them, soda lime glass is particularly preferable. Its forming method is also not particularly limited and, for example, float plate glass formed by a float method or the like may be used. Further, the glass plates 1A, 1B have been preferably subjected to tempering such as thermally tempering or chemical tempering.

Examples of the organic glass (resin) include a polycarbonate resin, a polystyrene resin, an aromatic polyester resin, an acrylic resin, a polyester resin, a polyarylate resin, a polycondensate of halogenated bisphenol A and ethylene glycol, an acrylic urethane resin, a halogenated aryl group-containing acrylic resin and the like. Among them, the polycarbonate resin such as an aromatic polycarbonate resin and the acrylic resin such as a polymethyl methacrylate-based acrylic resin are preferable, and the polycarbonate resin is more preferable. Further, among the polycarbonate resins, a bisphenol A-based polycarbonate resin is particularly preferable. Note that the glass plate may be formed by containing two or more kinds of the above-described resins.

Further, the glass plates 1A, 1B may be glass plates with infrared absorbency and ultraviolet absorbency imparted by containing an infrared absorbent, an ultraviolet absorbent, and the like in the above-described inorganic glass or organic glass (resin). As such a glass plate, a green glass plate, an ultraviolet-absorbing (UV) green glass plate, or the like can be used. Note that the UV green glass plate indicates ultraviolet-absorbing green glass containing not less than 68 mass % nor more than 74 mass % of $SiO_2$, not less than 0.3 mass % nor more than 1.0 mass % of $Fe_2O_3$, and not less than 0.05 mass % nor more than 0.5 mass % of FeO, and having ultraviolet transmittance at a wavelength of 350 nm of 1.5% or less and a minimum value of transmittance in a region of not less than 550 nm nor more than 1700 nm.

As the above-described glass, a colorless and transparent material with no coloring component added thereto may be used, or a colored and transparent material colored like the above-described green glass within the range not impairing the effect of the present invention may be used. Moreover, in these sheets of glass, one kind may be used or two or more kinds of them may be used in combination, and for example, a laminated substrate may be made by laminating two or more layers. Though depending on the kind of automobile to which the laminated glass is applied, the inorganic glass is preferable as glass.

Further, since the laminated glass is intended for the automobile windshield, in order that a visible light transmittance (Tv) measured in accordance with JIS R3212 (1998) is preferably 70% or more, and more preferably 74% or more in forming the laminated glass, Tvs of the glass plates 1A, 1B are each preferably 75% or more, and more preferably 80% or more.

The pair of glass plates 1A, 1B used for the laminated glass 10A may be made of different kinds of materials from each other, but are preferably made of the same kind of material. A shape of the glass plates 1A, 1B may be flat or may entirely or partially have a curvature. In the glass plates 1A, 1B, a surface to be exposed to the atmosphere may be subjected to a coating that imparts a water repellent function, a hydrophilic function, an antifogging function and the like. Further, facing surfaces of the glass plates 1A, 1B facing each other may be subjected to functional coatings normally including metal layers such as a low-emissivity coating, an infrared shielding coating, and a conductive coating.

Note that in the case where the facing surfaces of the glass plates 1A, 1B have the above-described functional coatings, the following skin layers 41, 43 of the intermediate film 2A are constituted to be in contact with the functional coatings on the facing surfaces of the glass plates 1A, 1B.

[Intermediate Film]

The intermediate film 2A in the laminated glass 10A has a constitution in which five layers are laminated in the order of the skin layer 41, the core layer 31, the skin layer 42, the core layer 32, and the skin layer 43 from the glass plate 1A side toward the glass plate 1B side. The intermediate film 2A is disposed between the glass plates 1A and 1B, and has a function of bonding the glass plates 1A, 1B to integrate them as the laminated glass 10A.

The glass transition point of each of the core layers 31, 32 is lower than 15° C., and the glass transition point of each of the skin layers 41, 42, 43 is 15° C. or higher. The core layers 31, 32 and the skin layers 41, 42, 43 are composed of thermoplastic resins used for laminated glass normally and being a main material composing an intermediate film by appropriately selecting the resins so as to obtain each of the above-described glass transition points for each of the layers. As long as an adjustment to the above-described glass transition points is possible, the kind of thermoplastic resin to be used is not particularly limited. Hereinafter, the glass transition point of the core layer is sometimes referred to as Tgc, and the glass transition point of the skin layer is sometimes referred to as Tgs.

Tgc is preferably 10° C. or lower, and more preferably 8° C. or lower. When Tgc is lower than 15° C., desired sound insulating performance is obtained in the laminated glass. Tgc is preferably −10° C. or higher and more preferably 0° C. or higher from the viewpoint of shape retention of the core layer in itself.

Tgs is preferably 20° C. or higher, and more preferably 25° C. or higher. When Tgs is 15° C. or higher, desired sound insulating performance is obtained in the laminated glass. Tgs is preferably 50° C. or lower, and more preferably 40° C. or lower from the viewpoint of penetration resistance.

From the viewpoint of enhancing the sound insulating property, a value obtained by subtracting Tgc from Tgs is preferably 10 to 40° C., and more preferably 20 to 35° C.

Examples of the thermoplastic resins capable of enabling the above-stated Tgc in the core layer and the above-stated Tgs in the skin layer respectively specifically include thermoplastic resins such as a polyvinyl acetal resin such as a polyvinyl butyral resin (PVB), a polyvinyl chloride resin (PVC), a saturated polyester resin, a polyurethane resin, an ethylene-vinyl acetate copolymer resin (EVA), an ethylene-ethyl acrylate copolymer resin, and a cycloolefin polymer (COP). Tgc or Tgs can be adjusted to fall within the above ranges by, for example, adjusting an amount of a plasticizer or the like of these thermoplastic resins. The thermoplastic resins may be used independently or two or more kinds may be used in combination.

The thermoplastic resins are selected according to purposes of the laminated glass and in consideration of balance among various performances such as transparency, weather resistance, adhesive strength, penetration resistance, impact energy absorbency, moisture resistance, heat insulating property in addition to the conditions of Tgc and Tgs in the core layer and the skin layer, respectively. From the above viewpoint, PVB, EVA, the polyurethane resin and the like are preferable as the thermoplastic resin forming the core layer. Besides, PVB, EVA, the polyurethane resin and the like are preferable as the skin layer.

Tgc of the two or more core layers constituting the intermediate film may be the same or different as long as Tgc is in the above-described range in each core layer. When the intermediate film has a plurality of skin layers, Tgs of the skin layers may be the same or different as long as Tgs is in the above-described range in each skin layer. Further, kinds of the thermoplastic resins forming the core layer and the skin layer may be the same or different by each of the core layer and the skin layer. The intermediate film preferably has a constitution in which Tgc and the kind of the thermoplastic resin of the two or more core layers are the same, Tgs and the kind of the thermoplastic resin of the plurality of skin layers are the same when the plurality of skin layers are provided, and the kinds of the thermoplastic resins of the core layers and the skin layers are the same.

In the laminated glass of the present invention, the intermediate film has a constitution in which the core layers each satisfying the above-described Tgc and the skin layers each satisfying the above-described Tgs are alternately laminated, and two or more core layers are included. As long as the intermediate film has the above-described laminated structure, the total number of layers is not particularly limited.

Note that the intermediate film mass % is preferably 14 mass % or more in a relationship between the intermediate film and the glass plates. The constitution with the smallest number of layers in the intermediate film is a constitution in which a skin layer is sandwiched by a pair of core layers. In that case, laminated glass has a laminated structure of a glass plate, a core layer, a skin layer, a core layer, a skin layer, a core layer, and a glass plate.

From the viewpoint of workability at a time of manufacturing the laminated glass, the intermediate film is preferably constituted to have the skin layers so as to be in contact with facing surfaces of the pair of glass plates. Further, in the intermediate film, a thickness between a pair of core layers which are the closest to the pair of glass plates (hereinafter, it is also referred to as "a thickness between outermost core layers".) is preferably 0.45 mm or more. Furthermore, in the intermediate film, a surface density of all of the layers which are disposed between the pair of core layers which are the closest to the pair of glass plates (hereinafter, it is also referred to as "a surface density between outermost core layers".) is preferably 0.5 kg/m² or more.

A constitution with the smallest number of layers as the intermediate film having the laminated structure having the skin layers so as to be in contact with the facing surfaces of the pair of glass plates and having the two or more core layers is a constitution of the intermediate film 2A illustrated in FIG. 2 in which five layers of the skin layer 41, the core layer 31, the skin layer 42, the core layer 32, and the skin layer 43 are laminated. The core layers 31, 32 and the skin layers 41, 42, 43 may have a single-layer structure or a multilayer structure as long as each of the core layers and the skin layers satisfies the above-described Tgc and Tgs.

A thickness between the pair of core layers 31, 32 which are the closest to the pair of glass plates 1A, 1B respectively in the intermediate film 2A is indicated as Ta in FIG. 2. Further, a thickness of the intermediate film 2A is indicated as Tb in FIG. 2. The thickness Ta between the outermost core layers is preferably 0.45 mm or more, and more preferably 0.50 mm or more from the viewpoint where the intermediate film undergoes sufficient shear deformation, thus increasing the sound insulating performance of the laminated glass. Though an upper limit of the thickness Ta between the outermost core layers is not particularly limited, Ta is preferably 4.0 mm or less, and more preferably 3.0 mm or less from the viewpoint of reduction in weight. Note that in the laminated glass 10A, the thickness Ta between the outermost core layers is equal to a thickness of the skin layer 42.

The surface density between the outermost core layers in the intermediate film 2A is a surface density of the skin layer 42. The surface density between the outermost core layers in the intermediate film is preferably 0.5 kg/m² or more, more preferably 0.55 kg/m² or more, and further preferably 0.6 kg/m² or more from the viewpoint where the intermediate film undergoes sufficient shear deformation, thus increasing the sound insulating performance of the laminated glass, similarly to the thickness Ta between the outermost core layers. Though an upper limit of the surface density between the outermost core layers is not particularly limited, the surface density is preferably 3.3 kg/m² or less, more preferably 2.0 kg/m² or less, and further preferably 1.3 kg/m² or less from the viewpoint of reduction in weight.

The thickness Tb of the intermediate film 2A is a sum of the thicknesses of the core layers 31, 32 and the skin layers 41, 42, 43, and it is preferably 1.53 mm or more, more preferably 1.7 mm or more, and further preferably 2.0 mm or more from the point of setting the intermediate film mass % to fall within the above-described range and the viewpoint of the sound insulating property. Though an upper limit of the thickness Tb of the intermediate film 2A is not particularly limited, Tb is preferably 4.0 mm or less from the viewpoint of reduction in weight.

The thicknesses of the core layers 31, 32 are not particularly limited. They are each preferably 0.05 to 0.2 mm, and more preferably 0.07 to 0.15 mm from the viewpoints of the sound insulating property and the reduction in weight of the laminated glass and setting Ta and Tb to fall within the above-described ranges, and so on. The thicknesses of the core layers 31, 32 may be the same as or different from each other. The thicknesses of the pair of core layers 31, 32 which are the closest to the pair of glass plates 1A, 1B respectively in the intermediate film 2A and the skin layer 41 and the skin layer 43 located between the pair of glass plates 1A, 1B respectively are not particularly limited. The thicknesses thereof are each preferably 0.15 to 1.1 mm, more preferably 0.2 to 0.76 mm, and further preferably 0.2 to 0.45 mm from the viewpoints of the sound insulating property and the reduction in weight of the laminated glass and setting Ta and Tb to fall within the above-described ranges, and so on.

Here, FIG. 2 illustrates a cross-section obtained by cutting the laminated glass 10A along the horizontal direction on a line X-X passing through the center point of the laminated glass 10A as a representative example of a cross-section perpendicular to a principal surface of the laminated glass 10A. As illustrated in FIG. 2, in the laminated glass 10A, the glass plates 1A, 1B and the intermediate film 2A are laminated in a uniform thickness between from one end portion to the other end portion in the horizontal direction. In the laminated glass 10A, all cross-sections perpendicular to the principal surface thereof are similar. For example, also regarding a cross-section obtained by cutting the laminated glass 10A along the vertical direction on a line Y-Y passing through the center point of the laminated glass 10A, it is possible to confirm that the glass plates 1A, 1B and the intermediate film 2A are laminated in a uniform thickness between from one end portion to the other end portion similarly to the one illustrated in FIG. 2. Thus, in the laminated glass 10A, the thicknesses of the layers, and Ta and Tb are the same at all places in the principal surface.

For fabrication of the core layers and the skin layers in the intermediate film, a thermoplastic resin-containing composition containing the above-described thermoplastic resin as a main component is used. The thermoplastic resin-containing composition may contain, for example, one kind or two or more kinds of various additives such as an infrared absorbent, an ultraviolet absorbent, a fluorescer, an adhesion regulator, a coupling agent, a surface-active agent, an antioxidant, a heat stabilizer, a light stabilizer, a dehydrating agent, a defoaming agent, an antistatic agent, and a flame retarder within the range not impairing the effect of the present invention according to various purposes. These additives may be entirely uniformly contained in each of the core layers and the skin layers.

Note that regarding the additives such as the infrared absorbent, the ultraviolet absorbent, and the fluorescer, in particular, among the above-described additives, which are contained for imparting additional functions to the core layer and the skin layer, for example, in the intermediate film 2A in the laminated glass 10A, in the layers of the intermediate film formed of five layers in total of the core layers 31, 32 and the skin layers 41, 42, 43, only one layer or two or more layers may contain the additives. Furthermore, when two or more layers contain the additives, the two or more layers may contain the same kind of additive in the same amount or in different amounts, and may contain the different additives from one another.

For example, the intermediate film 2A is produced by preparing the core layers 31,32 and the skin layers 41, 42, 43 formed into sheet shapes from the thermoplastic resin-containing compositions, laminating the obtained layers in the order of the skin layer 41, the core layer 31, the skin layer 42, the core layer 32, and the skin layer 43, and heating them under pressure. The compositions are suitable for the layers respectively such that the thicknesses of the layers preferably fall within the above-described ranges, when they are finally formed into the laminated glass. Alternatively, the intermediate film 2A may be integrally produced by coextrusion. The fabrication conditions are appropriately selected depending on the kind of the thermoplastic resin. The intermediate film 2B can be similarly produced.

In order to make the maximum degree of unevenness of the test area A fall within 3 μm or less in the laminated glass of the present invention, for example, a film thickness of the intermediate film 2A is preferably produced so as to be uniform in at least a surface of an area corresponding to the test area A of the laminated glass 10A. Specifically, by extending the intermediate film laminated and obtained in the above-described manner by an ordinary method, for example, by using an extending roll, an intermediate film having a uniform film thickness in the surface can be obtained. Note that since an area thereof is expanded by the extension and the film thickness decreases, the area and the film thickness of the laminated film to be provided for the extension are adjusted so that the finally obtained intermediate film has predetermined area and film thickness. A degree of making the film thickness uniform in the surface in the intermediate film can be adjusted according to a degree of the extension. The degree of the extension can be adjusted by a curvature, an extension rate, and temperature setting of the extending roll, and so on, for example, in a case of using the extending roll.

In the laminated glass of the present invention, in terms of easily adjusting the thickness between the pair of core layers which are the closest to the pair of glass plates in the above-described range, the intermediate film preferably has three or more core layers. Note that the number of core layers is preferably five layers or less from the viewpoint of easiness on manufacture of the intermediate film. Also when the intermediate film has the three or more core layers, the laminated glass preferably has the skin layers so as to be in contact with the facing surfaces of the pair of glass plates.

Figure 5:
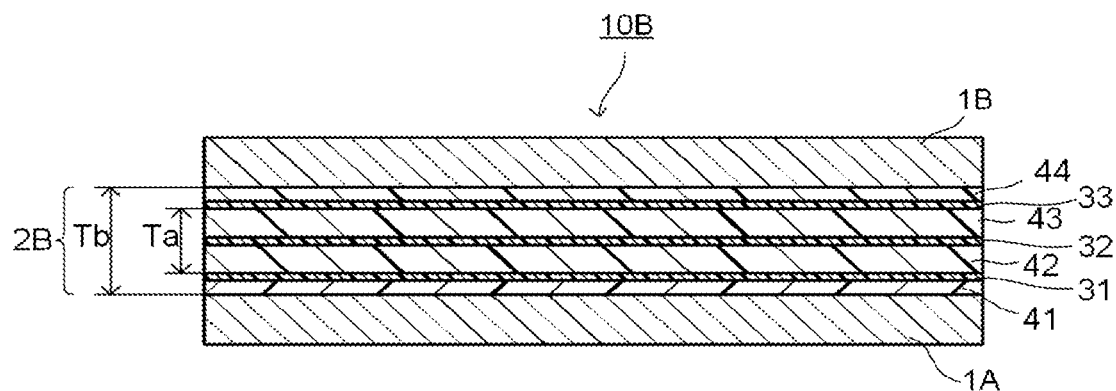
FIG. 5 is a cross-sectional view along a horizontal direction of another example of the embodiment of the laminated glass of the present invention.

FIG. 5 illustrates a cross-sectional view of an example of the embodiment of the laminated glass of the present invention having an intermediate film constituted of a seven-layer laminated film, which has a constitution having the smallest number of layers as an intermediate film of a laminated structure having the skin layers so as to be in contact with the facing surfaces of the pair of glass plates and having the three or more core layers. In laminated glass 10B whose cross-section is illustrated in FIG. 5, for example, a front view is similar to a front view of the laminated glass 10A (FIG. 1), and the cross-section illustrated in FIG. 5 is, for example, a cross-section along the horizontal direction, taken along a line X-X.

An intermediate film 2B which the laminated glass 10B has is constituted by laminating the seven lays of the skin layer 41, the core layer 31, the skin layer 42, the core layer 32, the skin layer 43, the core layer 33, and the skin layer 44. In the laminated glass 10B, a pair of core layers which are the closest to the pair of glass plates 1A, 1B in the intermediate film 2B are the core layer 31 which is the closest to the glass plate 1A and the core layer 33 which is the closest to the glass plate 1B. In the intermediate film 2B, a thickness between the core layer 31 and the core layer 33 is Ta, and a sum of the thicknesses of the skin layer 42, the core layer 32, and the skin layer 43 is a thickness Ta between outermost core layers. Further, a surface density between the outermost core layers in the intermediate film 2B is a surface density in three layers by laminating the skin layer 42, the core layer 32, and the skin layer 43.

In the intermediate film according to the laminated glass of the present invention, preferable ranges of the thickness between the outermost core layers and the surface density between the outermost core layers are as described above regardless of a layer constitution between the outermost core layers. That is, the thickness Ta between the outermost core layers and the surface density between the outermost core layers in the intermediate film 2B can be made similar by including the thickness Ta between the outermost core layers and the surface density between the outermost core layers in the intermediate film 2A and a preferable value.

A thickness Tb of the intermediate film 2B is a sum of the thicknesses of the core layers 31, 32, 33 and the skin layers 41, 42, 43, 44, and can be made similar by including the thickness Tb in the intermediate film 2A and a preferable range. The thicknesses of the core layers 31, 32, 33 in the intermediate film 2B are each preferably 0.05 to 0.2 mm, and more preferably 0.07 to 0.15 mm from the viewpoints of the sound insulating property and the reduction in weight of the laminated glass and setting Ta and Tb to fall within the above-described ranges, and so on. The thicknesses of the skin layers 41, 42, 43, 44 in the intermediate film 2B are each preferably 0.15 to 1.1 mm, more preferably 0.2 to 0.76 mm, and further preferably 0.2 to 0.45 mm from the viewpoints similar to the above-described ones. The thicknesses of the core layers may be the same as or different from one another, and the thicknesses of the skin layers may be the same as or different from one another.

In the laminated glass 10B, except that a laminated constitution of the intermediate film 2B is different from a laminated constitution of the intermediate film 2A of the laminated glass 10A, the entire other constitution can be made similar to that of the laminated glass 10A. Production of the intermediate film 2B can also be made similar to that of the intermediate film 2A.

The intermediate film in the laminated glass of the present invention has been described above using the intermediate films 2A, 2B as examples in the case where two core layers are provided and the case where three core layers are provided. Also in an intermediate film in the case where four or more core layers are provided, the core layer and the skin layer only need to be designed appropriately similarly to the above in consideration of the intermediate film mass %, the thickness Ta between the outermost core layers, the surface density between the outermost core layers, and the thickness Tb of the intermediate film.

The intermediate film in the laminated glass of the present invention may be the one where the layers each have a uniform thickness in the principal surface of the laminated glass as in each of the intermediate films 2A, 2B or may be the one where the layers have different thicknesses in the principal surface. In that case, the thicknesses of the layers, the thickness Ta between the outermost core layers, and the thickness Tb of the intermediate film are preferably designed such that a value measured at a place where the thickness of the intermediate film is the largest falls within the range when the layers each have the uniform thickness in the principal surface of the laminated glass as described above, specifically, the range illustrated in each of the intermediate films 2A, 2B. Besides, the intermediate film mass % and the surface density are physical properties measured with respect to the entire laminated glass as described above.

Figure 6:
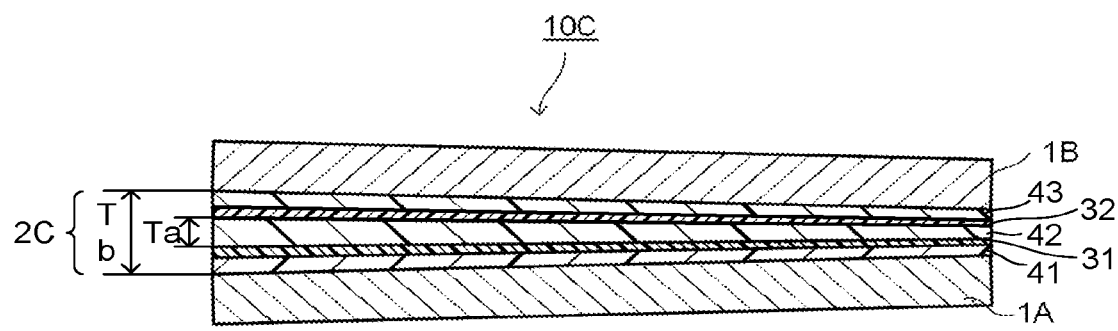
FIG. 6 is a cross-sectional view along a vertical direction of still another example of the embodiment of the laminated glass of the present invention.

FIG. 6 is a cross-sectional view along the vertical direction in another example of the embodiment of the laminated glass of the present invention using a five-layer laminated film as the intermediate film. In laminated glass 10C whose cross-sectional is illustrated in FIG. 6, for example, a front view is similar to the front view of the laminated glass 10A (FIG. 1), and the cross-sectional view illustrated in FIG. 6 is, for example, a cross-sectional view along the vertical direction, taken along a line Y-Y. In the cross-sectional view of the laminated glass 10C illustrated in FIG. 6, the left side is the upper edge side, and the right side is the lower edge side.

As illustrated in FIG. 6, an intermediate film 2C which the laminated glass 10C has is the intermediate film in so-called a wedge shape gradually reduced in thickness from the upper edge toward the lower edge. A laminated constitution of the intermediate film 2C is a five-layer constitution in which the skin layer 41, the core layer 31, the skin layer 42, the core layer 32, and the skin layer 43 are laminated in the order from the glass plate 1A side toward the glass plate 1B side. Any of the skin layer 41, the core layer 31, the skin layer 42, the core layer 32, and the skin layer 43 is formed to gradually reduce the thickness at the same rate from the upper edge toward the lower edge.

Usually, in such a laminated glass, the thickness of the intermediate film and each of the layers constituting the intermediate film is fixed from one end portion toward the other end portion in the upper edge, and the thickness of the intermediate film and each of the layers constituting the intermediate film is fixed from one end portion toward the other end portion in the lower edge.

In the laminated glass 10C, a place where the thickness of the intermediate film 2C is the largest is the upper edge. FIG. 6 illustrates measurement places of the thickness Ta between the outermost core layers and the thickness Tb of the intermediate film 2C in the intermediate film 2C. In the intermediate film 2C, the similar thicknesses to those in the intermediate film 2A can be applied as Ta and Tb measured at the upper edge. Further, the similar thicknesses to those in the intermediate film 2A can be applied as the thicknesses at the upper edge being the place where the thicknesses are the largest regarding thicknesses of the layers in the intermediate film 2C similarly to Ta and Tb.

In the laminated glass, generally, the intermediate film is sometimes used while partially extended according to the shape of the principal surface of the laminated glass. In that case, the thickness of the intermediate film at the extended part becomes smaller than the thickness of the intermediate film at a not-extended part. Also in such a case, similarly to a case of the above-described intermediate film whose cross-section is a wedge shape, the thicknesses of the layers, the thickness Ta between the outermost core layers, and the thickness Tb of the intermediate film are preferably designed such that the values each measured at the place where the thickness of the intermediate film is the largest fall within the range when the layers each have the uniform thickness in the principal surface of the above-described laminated glass, specifically, within the ranges illustrated by using the intermediate film 2A, 2B.

Note that also in any of the above-described sheets of laminated glass 10A, 10B, 10C, the measuring method of the degree of unevenness in the test area A is similar, and the maximum degree of unevenness is 3 μm or less.

The intermediate film in the laminated glass of the present invention preferably has a storage modulus G' of $5.0 \times 10^4$ Pa or more, and more preferably $1.0 \times 10^5$ Pa or more measured at a frequency of 1 Hz and a temperature of 20° C. The storage modulus G' is an index indicating rigidity of the intermediate film, and as long as the storage modulus G' of the intermediate film is within the above range, sufficient rigidity can be secured.

An upper limit of the storage modulus G' of the intermediate film is not particularly limited. However, when the storage modulus G' of the intermediate film becomes high, the sound insulating performance of the laminated glass may damaged. Besides, when the storage modulus G' of the intermediate film is too high, productivity may decrease such as needing a specific device in process of cutting or the like. Further, the intermediate film may become brittle to decrease penetration resistance. Considering such points, the storage modulus G' of the intermediate film is preferably $1.0 \times 10^7$ Pa or less. Note that the storage modulus G' of the intermediate film in this embodiment is a storage modulus in a dynamic viscoelasticity test measured under conditions of a frequency of 1 Hz, a temperature of 20° C., and a dynamic shear strain of 0.015% by a shearing method, for example, by using Rheometer MCR 301 manufactured by Anton Paar GmbH.

[Laminated Glass]

The laminated glass of the present invention includes a pair of glass plates facing each other, and an intermediate film having the above-described constitution sandwiched between the pair of glass plates, in which a maximum degree of unevenness is 3 μm or less in a test area A. The maximum degree of unevenness in the test area A preferably falls within the above-described range. Furthermore, a preferable maximum degree of unevenness in a test area B having a larger area than the test area A falls within the above-described range. In the laminated glass of the present invention, the intermediate film mass % is preferably 14 mass % or more, and more preferably falls within the above-described range. The surface density of the laminated glass is also as described above.

In the present invention, the above-described glass plates and intermediate film are appropriately combined so that the maximum degree of unevenness, the intermediate film mass %, the surface density, and so on fall within the predetermined ranges and the preferable ranges as the obtained laminated glass. An adjustment of the maximum degree of unevenness in the test area A of the laminated glass is made by enhancing film thickness uniformity in a surface, in at least an area corresponding to the test area A of the laminated glass by the above-described method mainly when the intermediate film is manufactured.

The laminated glass of the present invention includes a pair of glass plates facing each other, and an intermediate film sandwiched between the pair of glass plates and including skin layers and core layers alternately laminated. Each skin layer has a glass transition point of 15° C. or higher, each core layer has a glass transition point of lower than 15° C., the intermediate film includes two or more core layers. The laminated glass has a maximum degree of unevenness is 3 μm or less in a test area A, allowing a perspective distortion$_{Max}$ to be set to 220 [mdpt] or less in which the perspective distortion can hardly be visually confirmed and allowing a high sound insulating property and a high visibility indicated below to be compatible with each other.

The laminated glass of the present invention has high sound insulating performance due to the above-described constitution. Specifically, the laminated glass of the present invention preferably has a loss coefficient of 0.4 or more at a primary resonance point measured in a frequency domain of 0 to 10000 Hz under the condition of a temperature of 20° C. Hereinafter, the primary resonance point refers to a primary resonance point measured in a frequency domain of 0 to 10000 Hz under the condition of a temperature of 20° C. unless otherwise specified.

Note that the loss coefficient at the primary resonance point can be measured by a central exciting method based on ISO_PAS_16940. As a measurement apparatus for the loss coefficient by the central exciting method, for example, a central exciting method measurement system (MA-5500, DS-2000) manufactured by ONO SOKKI Co., Ltd. can be exemplified. The frequency domain of the primary resonance point in the laminated glass of the present invention is about 0 to 300 Hz. The laminated glass of the present invention, having the loss coefficient at the primary resonance point of 0.4 or more, can sufficiently insulate sound in a relatively low frequency domain, such as, for example, engine sound and vibration sound of tires of an automobile. Further, the laminated glass of the present invention, having the loss coefficient at the primary resonance point of 0.4 or more, can efficiently insulate sound from a low frequency domain to a high frequency domain because the loss coefficients at higher-order resonance points such as a secondary resonance point to a seventh-order resonance point are also likely to be relatively high, for example, 0.4 or more.

In the laminated glass of the present invention, the loss coefficient at the primary resonance point is more preferably 0.42 or more, and further preferably 0.45 or more. Further, in the laminated glass of the present invention, the loss coefficients are particularly preferably 0.5 or more at both the primary resonance point and the secondary resonance point. Note that, for example, in laminated glass in a curved shape, the loss coefficient is measured by producing laminated glass using flat glass plates to have the constitution equivalent to that of the laminated glass in the curved shape.

Furthermore, the laminated glass of the present invention preferably has a three-point bending rigidity of 100 N/mm or more. The three-point bending rigidity is rigidity obtained by a three-point bending test, and can be measured by, for example, a compression and tensile testing machine. The three-point bending rigidity is particularly preferably 120 N/mm or more. The three-point bending rigidity of the laminated glass of 100 N/mm or more is preferable because it is the rigidity at a level allowing vehicle rigidity to be secured.

The laminated glass of the present invention preferably also has a sound transmission loss of 35 dB or more in a coincidence region measured based on SAE J1400, and particularly preferably 42 dB or more. The laminated glass having the sound transmission loss of 35 dB or more can be evaluated to be excellent in the sound insulating property.

(Another Layer)

The laminated glass in the embodiment may have a functional film between the pair of glass plates as another layer within the range not impairing the effect of the present invention. When the functional film is included, for example, a constitution in which the functional film is sandwiched between the layers of the intermediate film constituted by the plurality of layers as stated above is preferable.

As the functional film, there can be cited, for example, an infrared shielding film and the like. The infrared shielding film, specifically, include a conventionally known infrared reflective film, having a film thickness of about 100 to 500 nm, formed on a supporting film such as a PET film, having a thickness of about 25 to 200 μm. Examples of the infrared reflective film include a single-layer or multilayer infrared reflective film of a dielectric multilayer film, a liquid crystal alignment film, an infrared reflector-containing coating film, and a metal film. Examples of the infrared shielding film include a dielectric multilayer film made by laminating resin films different in refractive index and having a total film thickness of about 25 to 200 μm.

When the laminated glass of the present invention has the functional film, and the functional film exists between the outermost core layers, the thickness Ta between the outermost core layers and the surface density between the outermost core layers are measured and calculated under a state where the functional film is included. Further, the thickness Tb of the intermediate film and the intermediate film mass % are measured and calculated while the functional film is excluded, and the surface density of the laminated film is calculated under the state where the functional film is included.

The laminated glass of the embodiment may have, for example, a black ceramic layer arranged in a band shape at a part or all of a peripheral edge portion of the laminated glass as another layer for a purpose of hiding portions attached to a frame body or the like of the laminated glass, a wiring conductor and so on. A width of the black ceramic layer is appropriately selected according to the kind of automobile on which the laminated glass is mounted. The black ceramic layer is usually formed in a frame shape having a width of about 10 to 200 mm.

The black ceramic layer can be formed into the above-described shape by an ordinary method on the principal surface on the atmosphere side or the intermediate film side of either one of the pair of glass plates which the laminated glass has, for example. The formation place of the black ceramic layer is appropriately selected according to the use. Note that when the laminated glass of the present invention has the black ceramic layer, the thickness Tb of the intermediate film and the intermediate film mass % are measured and calculated while excluding the black ceramic layer, and the surface density of the laminated glass is calculated under a state where the black ceramic layer is not included.

Note that "black" of the black ceramic layer does not mean, for example, black defined by three attributes of color or the like, but includes a range where it is recognizable as black adjusted to inhibit visible light from being transmitted to an extent capable of hiding at least a portion required to be hidden. Accordingly, in the black ceramic layer, the black may have gradation as necessary within a range in which the black can fulfill this function, and a color shade of the black may be slightly different from the black defined by three attributes of color. From the same viewpoint, the black ceramic layer may be constituted to be an integrated film in which the entire layer continues or may be formed of dot patterns or the like in which the percentage of visible light transmission can be easily adjusted by the setting of the shape, arrangement or the like, according to the place where the black ceramic layer is arranged.

Further, the laminated glass of this embodiment may have a shade region as described below. In the automobile windshield, in general, a band-shaped shade region is sometimes formed which is colored in green, blue, and so on for improvement of antiglare property, heat shielding property and so on. The shade region is sometimes provided on the surface of the glass plate but often formed by coloring the intermediate film in a band shape. On the other hand, since there is a legal visual field region where the visible light transmittance is to be set to a predetermined value or more (for example, 70% or more), the shade region of the automobile windshield is usually arranged on an upper portion of the automobile windshield that is outside the visual field region.

[Manufacture of Laminated Glass]

The laminated glass of the embodiment of the present invention can be manufactured by a generally used publicly-known technology. For the laminated glass 10A, the intermediate film 2A is produced and disposed between the pair of glass plates 1A and 1B to prepare a laminated glass precursor being laminated glass before compression bonding. The intermediate film 2A includes the skin layer 41, the core layer 31, the skin layer 42, the core layer 32, and the skin layer 43 which are laminated in this order. The intermediate film 2A is produces by a method as described above, or by coextrusion in forming the layers. The laminated glass precursor includes the glass plate 1A, the intermediate film 2 (however, the skin layer 41 is located on the glass plate 1A side), and the glass plate 1B which are laminated in this order. Also in the case of having another layer, the glass plates and the layers are laminated in the similar lamination order to that of similarly obtained laminated glass to prepare a laminated glass precursor.

This laminated glass precursor is put in a vacuum bag such as a rubber bag, this vacuum bag is connected to an exhaust system, and the laminated glass precursor is subjected to bonding at a temperature of about 70 to 110° C. while pressure-reduction suction (deaeration) was being performed to bring the inside of the vacuum bag into a pressure reduction degree of about −65 to −100 kPa, thereby allowing the laminated glass in the embodiment to be obtained. Furthermore, for example, the laminated glass precursor is subjected to compression bonding by heating and pressurizing under conditions of 100 to 140° C. and a pressure of 0.6 to 1.3 MPa, thereby allowing laminated glass further excellent in durability to be obtained.

The laminated glass of the present invention can attain a prominent sound insulating effect as the laminated glass for automobile windshield, and is laminated glass hardly having such perspective distortion as inhibits driver's visibility. Furthermore, the reduction in weight of the laminated glass can be attained in preferable aspect.

Note that since the laminated glass of the present invention is used for the automobile windshield, it preferably has a visible light transmittance of 70% or more, and more preferably 74% or more measured according to JIS R3212 (1998). Tts (Total solar energy transmitted through a glazing) measured according to ISO13837-2008 is preferably 66% or less, and more preferably 60% or less.

EXAMPLES

Hereinafter, the present invention will be described in more detail using examples. The present invention is not limited to the embodiments and examples described below. Examples 1, 2 are examples, and Examples 3, 4 are comparative examples.

Examples 1 to 4

Laminated glass for evaluation of each of Examples 1 to 4 having constitutions listed in Table 1, in which a size of a principal surface was 30 cm square, was manufactured and evaluated as described below. A laminated constitution of the laminated glass was a constitution in which the intermediate film 2B obtained by laminating the same seven layers as illustrated in FIG. 5 was sandwiched by the glass plates 1A, 1B.

(Manufacture of Intermediate Film)

The intermediate film having a seven-layer laminated constitution listed in Table 1 in each of Examples was manufactured as described below.

A PVB sheet 1 (Tgs; 30° C.) having a predetermined film thickness for a skin layer and a PVB sheet 2 (Tgc; 3° C., PVB) having a predetermine film thickness for a core layer were prepared, and a laminate was formed by laminating in the order of the PVB sheet 1, the PVB sheet 2, two sheets of the PVB sheet 1, the PVB sheet 2, two sheets of the PVB sheet 1, the PVB sheet 2, and the PVB sheet 1. The obtained laminate was pressed by a hot press forming machine at 150° C., for 300 seconds, at a press pressure of 50 kg/cm$^2$, to obtain an intermediate film precursor with the laminated constitution of the skin layer 41 (0.33 mm)/the core layer 31 (0.1 mm)/the skin layer 42 (0.66 mm)/the core layer 32 (0.1 mm)/the skin layer 43 (0.66 mm)/the core layer 33 (0.1 mm)/the skin layer 44 (0.33 mm). The layers were denoted by the same reference signs as the reference signs in the layers of the intermediate film 2B illustrated in FIG. 5. Further, numeric values in parenthesis in the layers indicate film thicknesses of the layers after the pressing.

The obtained intermediate film precursors were uniformly extended overall by an extending roll such that the degree of extension in Example 1 was 20%, the degree of extension in Example 2 was 25%, the degree of extension in Example 3 was 10%, and the degree of extension in Example 4 was 12% respectively, to obtain intermediate films each having a seven-layer laminated constitution of the skin layer 41/the core layer 31/the skin layer 42/the core layer 32/the skin layer 43/the core layer 33/the skin layer 44 to be used for the laminated glass of each of Examples. Table 1 lists thicknesses of the layers in the intermediate films after the extension in Examples.

Table 1 lists the number of core layers, a thickness Ta between outermost core layers, a surface density between the outermost core layers, and a thickness Tb of the intermediate film, in the intermediate film of the laminated glass in each of Examples together.

(Manufacture of Laminated Glass)

The intermediate film manufactured as described above in each of Examples was cut into 300 mm×300 mm, and so as to sandwich the cut intermediate film between two glass plates (soda lime glass of 300 mm×300 mm) each having a plate thickness listed in Table 1, for example, so as to become a similar laminated constitution to that of the laminated glass 10B in FIG. 5, the glass plate 1A, the intermediate film 2B, and the glass plate 1B were laminated in the order, to form a laminate. This laminate was put in a vacuum bag and subjected to pressure-reduction compression bonding at 110° C. while deaeration was being performed so as to bring the inside of the vacuum bag into a pressure reduction degree of −60 kPa or less, and then subjected to further heating-pressurization compression bonding under conditions of a temperature of 140° C. and a pressure of 1.3 MPa, thereby obtaining the laminated glass.

Table 1 lists a laminated glass surface density and intermediate film mass % in the laminated glass obtained in each of Examples. Further, degrees of unevenness were calculated by the above-described method at similar measurement points to the ones illustrated in FIG. 4. In each of Examples, both integers corresponding to n and m in FIG. 4 were (300/15)−1=19, and the degrees of unevenness were calculated at 19×19=361 measurement points. Table 1 lists maximum values [μm] thereof. Note that measurement of thicknesses at predetermined places of the laminated glass for calculating the degrees of unevenness was performed by a plate thickness measuring device (product name: Optigauge, manufactured by Lumetrics Inc.).

(Evaluation)

The perspective distortion$_{Max}$ and the sound insulating property of the laminated glass obtained in each of Examples 1 to 4 were measured as described below. Table 1 lists results thereof.

(1) Perspective Distortion$_{Max}$

The laminated glass obtained in the above was installed such that the angle which a horizontal plane formed with a principal surface thereof became 25 degrees, and the perspective distortion$_{Max}$ was measured by a distortion tester SCREENSCAN (product name) manufactured by ISRA VISION AG.

(2) Sound Insulating Property (Loss Coefficient)

Regarding the laminated glass obtained in the above, the loss coefficient at the primary resonance point at a frequency of 0 to 10000 Hz and at a temperature of 20° C. was measured based on ISO_PAS_16940, by using the central exciting method measurement system (MA-5500, DS-2000) manufactured by ONO SOKKI Co., Ltd.

TABLE 1

| Example | | 1 | 2 | 3 | 4 |
|---|---|---|---|---|---|
| Glass plate thickness [mm] | Glass plate 1A | 2.0 | 2.0 | 2.0 | 2.0 |
| | Glass plate 1B | 2.0 | 2.0 | 2.0 | 2.0 |
| Laminated constitution of intermediate film/each layer thickness [mm] | Skin layer 41 | 0.26 | 0.25 | 0.30 | 0.29 |
| | Core layer 31 | 0.08 | 0.08 | 0.09 | 0.09 |
| | Skin layer 42 | 0.53 | 0.50 | 0.59 | 0.58 |
| | Core layer 32 | 0.08 | 0.08 | 0.09 | 0.09 |
| | Skin layer 43 | 0.53 | 0.50 | 0.59 | 0.58 |
| | Core layer 33 | 0.08 | 0.08 | 0.09 | 0.09 |
| | Skin layer 44 | 0.26 | 0.25 | 0.30 | 0.29 |
| | Total thickness (Tb) | 1.82 | 1.71 | 2.05 | 2.01 |
| | The number of core layers | 3 | 3 | 3 | 3 |
| | Between outermost core layers | Thickness Ta [mm] | 1.14 | 1.07 | 1.28 | 1.25 |
| | | Surface density [kg/m$^2$] | 1.25 | 1.17 | 1.40 | 1.37 |
| | Degree of extension of intermediate film | 20% | 25% | 10% | 12% |
| Laminated glass | Surface density [kg/m$^2$] | 12.0 | 11.9 | 12.3 | 12.2 |
| | Intermediate film mass % | 20.1 | 18.8 | 22.6 | 22.1 |
| | Maximum degree of unevenness [μm] | 1.93 | 1.52 | 3.70 | 3.49 |
| Evaluation | Perspective distortion$_{Max}$ [mdpt] | 140 | 96 | 286 | 262 |
| | Loss coefficient | 0.47 | 0.47 | 0.47 | 0.47 |

It can be said from Table 1 that the laminated glasses of Example 1 and Example 2 being the examples are each laminated glass excellent in the sound insulating property and suitable as laminated glass for automobile windshield hardly having such perspective distortion as inhibits driver's visibility. Laminated glasses of the comparative examples each have the same laminated constitution of the skin layers and the core layers excluding film thicknesses as those of the examples, and are each laminated glass excellent in the sound insulating property, but the maximum degrees of unevenness fall out of the range of the present invention, resulting in laminated glass having large perspective distortion.

What is claimed is:

1. A laminated glass for automobile windshield comprising:
   a first and a second glass plate facing each other; and
   an intermediate film disposed between the glass plates and including a plurality of core layers and a plurality of skin layers alternately laminated,
   the plurality of core layers having a glass transition point of lower than 15° C.,
   the plurality of skin layers having a glass transition point of 15° C. or higher,
   a value obtained by subtracting the glass transition point of the core layer from the glass transition point of the skin layer being from 20 to 40° C.,
   the plurality of core layers including two or more core layers, and
   the laminated glass having a maximum degree of unevenness of 3 μm or less in a test area A, where
   the test area A is defined by JIS R3212 (1998),
   degree of unevenness are measured as follows:
   drawing first straight lines and second straight lines in the test area A to define a plurality of intersection points of the first and second straight lines, the first straight lines being along a vertical direction of the laminated glass and having 15 mm intervals, the second straight lines being along a horizontal direction orthogonal to the vertical direction and having 15 mm intervals, the plurality of intersection points excluding intersection points which distances from an upper end or a lower end of the test area A are shorter than 15 mm, and
   deciding degrees of unevenness at the plurality of intersection points by a following formula (1):

$$\text{Degree of unevenness} = |T - (T_{up} + T_{down})/2| \quad (1)$$

T: a thickness of laminated glass at a first point included in the plurality of intersection points,
   $T_{up}$: a thickness of laminated glass at a second point included in the plurality of intersection points and closest to the first point in an upper direction of the first point, the second point being at an upper end of the first straight lines on the first point when no intersection point exists in the upper direction of the first point, and
   $T_{down}$: a thickness of laminated glass at a third point included in the plurality of intersection points and closest to the first point in a lower direction of the first point, the third point being at a lower end of the first straight lines on the first point when no intersection point exists in the lower direction of the first point.

2. The laminated glass according to claim 1, wherein a ratio of a mass of the intermediate film to a total mass of the intermediate film and the pair of glass plates is 14 mass % or more.

3. The laminated glass according to claim 1, wherein
   the plurality of skin layers includes a first skin layer in contact with the first glass plate, and a second skin layer in contact with the second glass plate,
   the plurality of core layers includes a first core layer closest to the first glass plate, and a second core layer closest to the second glass plate, and
   a thickness between the first and second core layers is 0.45 mm or more.

4. The laminated glass according to claim 1, wherein
   the plurality of skin layers includes a first skin layer in contact with the first glass plate, and a second skin layer in contact with the second glass plate, the plurality of core layers includes a first core layer closest to the first glass plate, and a second core layer closest to the second glass plate, and a surface density of total layers between the first and second core layers is 0.5 kg/m² or more.

5. The laminated glass according to claim 1, wherein the plurality of core layers includes three or more core layers.

6. The laminated glass according to claim 1, wherein the first glass plate is to set on a vehicle-exterior side and has a thickness of 1.6 to 2.5 mm, and the second glass plate is to set on a vehicle-interior side and has a thickness of 0.5 to 1.6 mm.

7. The laminated glass according to claim 1, wherein the intermediate film has a thickness of 1.53 mm or more.

8. The laminated glass according to claim 1, wherein the laminated glass has a surface density of 12 kg/m² or less.

9. The laminated glass according to claim 1, the laminated glass has a loss coefficient of 0.4 or more at a primary resonance point in a frequency of 0 to 10000 Hz and under a temperature of 20° C.

10. The laminated glass according to claim 1, wherein each of the core layers have a thickness of 0.05 to 0.15 mm.

\* \* \* \* \*